(No Model.)
C. W. STEBBINS.
CORN HOLDER.
No. 587,339.  Patented Aug. 3, 1897.
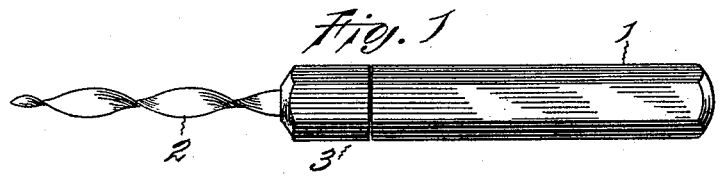
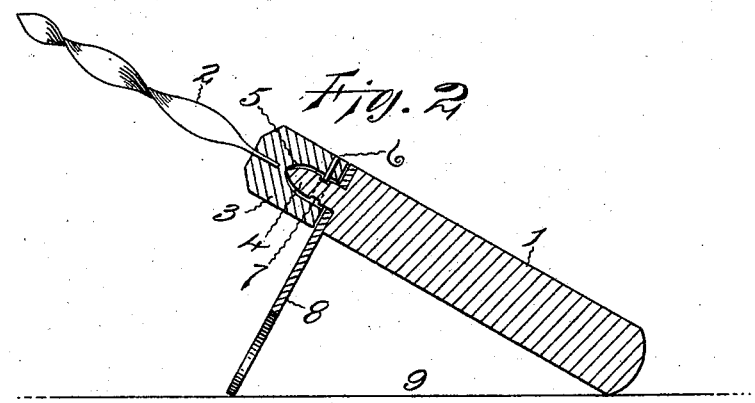
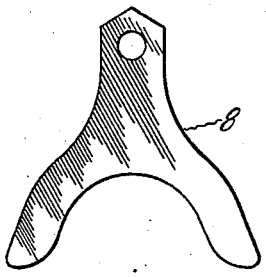
Witnesses:
Andrew Ferguson,
C. E. Strickland.
Inventor:
Charles W. Stebbins,
By his Attorney,
Willard Eddy.

UNITED STATES PATENT OFFICE.

CHARLES W. STEBBINS, OF HARTFORD, CONNECTICUT.

CORN-HOLDER.

SPECIFICATION forming part of Letters Patent No. 587,339, dated August 3, 1897.

Application filed November 19, 1896. Serial No. 612,693. (No model.)

*To all whom it may concern:*

Be it known that I, CHARLES W. STEBBINS, of Hartford, Hartford county, Connecticut, have invented certain new and useful Improvements in Corn-Holders, which improvements are described in the following specification and are illustrated by the accompanying drawings.

My invention relates to holders for ears of hot corn at table, and is designed to promote symmetry and simplicity in the form and structure of those utensils, as well as steadiness and convenience in the use and manipulation of them. To accomplish these objects, I use as component parts of my improved holder a spiral blade which is adapted to enter an ear of corn by rotation, a handle by which the implement is manipulated, and an intermediate swivel-joint and pivot which are adapted to facilitate the rotation of the blade.

The best manner in which I have contemplated applying the principles of my invention is illustrated by the said drawings.

Figure 1 is a side view of a corn-holder that is constructed in accordance with those principles. The same figure may be regarded also as a top view or as a bottom view of the same holder. Fig. 2 is a longitudinal section through the axis of Fig. 1 modified by the addition of a rest. Fig. 3 is a detail showing said rest.

In Figs. 1 and 2 the numeral 1 denotes the handle of the holder. This is preferably a bar of metal and may conveniently be made of sufficient weight to overbalance an ear of corn in the manner that is hereinafter described. In the same figures the numeral 2 denotes the blade, which is a flat metallic spiral sharp at the point and edges and long enough to hold with sufficient firmness an ear of corn that may be impaled upon it. This blade is rigidly connected with a base or thimble 3, which may be regarded as a continuation of handle 1. Between parts 1 and 3 are formed a pivot and a swivel-joint of the following description: As shown in Fig. 2, handle 1 has at its forward end a tapering and pointed finger 4, while thimble 3 has a corresponding central aperture 5. In this aperture finger 4 is held loosely in the position shown by means of a round-pointed pin 6, which projects from the wall of thimble 3 into a round-bottomed annular groove or channel
7 at the neck of finger 4.

Such being the construction of my improved corn-holder in its primary form, as shown in Fig. 1, its mode of operation requires but little description. Let one hand take the holder by the handle 1 and let the other hand grasp with a napkin or otherwise an ear of boiled corn. Then bring the point of blade 2 against the end of the ear with the axis of the holder and the axis of the ear in line with each other. Then as the holder and the ear are pushed together the blade advances with a rotary motion, screwing itself automatically into the core of the cob. During this operation the forward thrust of the handle is transmitted to the point of finger 4, which then reaches the forward end of hole 5 and constitutes a pivot on which the thimble 3 revolves. By this method the ear of hot corn is placed firmly on the holder in line with the handle and in a convenient position for cutting or gnawing off the corn. By a reverse movement the blade may be withdrawn from the cob at pleasure by pulling. When this occurs, the pull on handle 1 is transmitted to thimble 3 by the way of pin 6, which runs in groove 7, while blade 2 screws itself out of the cob automatically.

That modification of my invention which is shown in Fig. 2 is effected by attaching rigidly to handle 1 a rest 8, which is shown in detail in Fig. 3. This rest is a metallic plate broadened or bifurcated at the base and attached to the forward part of the handle next to thimble 3. When provided with this rest and placed upon table 9, the holder takes the position that is indicated in Fig. 2, and if the handle is made heavier than an ear of corn the holder retains that position when loaded and holds its burden up and out of contact with the table-cover.

Such being the construction and operation of my improved corn-holder, its special advantages are that it is in form symmetrical and convenient to handle, that it is simple in structure, that it holds the corn with steadiness by the use of one hand only, and that the rotation of the blade in entering and leaving the cob is automatic.

I claim as my invention—

In a corn-holder, a revolving spiral blade, and a handle that is made in two abutting segments, one of those segments being formed with a terminal concavity, and the other segment being provided with a terminal grooved finger, in combination with a pin, which holds the said finger of the latter segment in the said concavity of the former segment, substantially as and for the purpose specified.

In testimony whereof I hereunto set my name in the presence of two witnesses.

CHARLES W. STEBBINS.

Witnesses:
WILLARD EDDY,
JOHN H. BROCKLESBY.